United States Patent Office 3,411,878
Patented Nov. 19, 1968

3,411,878
ALUMINA AGGLOMERATES AND METHOD FOR PRODUCING SAME
Maxime Graulier, Paris, and Max Michel, Sarcelles-les-Rosiers, France, assignors to Produits Chimiques Pechiney-Saint-Gobain, Neuilly-sur-Seine, France
No Drawing. Filed Mar. 25, 1966, Ser. No. 537,277
Claims priority, application France, Mar. 31, 1965, 11,394
9 Claims. (Cl. 23—143)

This invention relates to agglomerates of alumina gel of high strength and a high degree of porosity whereby beneficial use can be made thereof as an absorbent or as a catalyst carrier.

Alumina agglomerates have a wide variety of uses, especially as absorbents and as catalyst carriers. Such applications demand an alumina agglomerate having special crystalline structure and porosity depending somewhat upon the utilization to be made. For such applications, consideration must be given to the wear or mechanical strength of the porous agglomerate, especially when employed in continuous operations where they might be exposed to impact and to frictional abrasion. Unfortunately, the development of high mechanical strength in porous alumina agglomerates is somewhat antagonistic to the production of agglomerates having a high degree of porosity.

Numerous investigations have been conducted with a view towards obtaining alumina agglomerates having various characteristics tailor-made for particular applications when fabricated of alumina, such as the type industrially available as hydrargillite, such as obtained from the Bayer process.

Many other processes have been proposed for the preparation of activated alumina agglomerates when starting from the hydrate. For example, it has been suggested to process the hydrate by rapid and partial dehydration in a current of warm air followed by agglomeration to granules by wetting with water. The formed agglomerates are then cured and heated to increase the hardness of the agglomerates and to reactivate the agglomerates. Agglomerates having different characteristics are capable of being produced of variable commercial value. However, when increased temperatures are employed for reactivation to produce agglomerates having lesser surface area, the mechanical strength of the agglomerates is seriously impaired.

The production of porous agglomerates of activated alumina from alumina gels has also previously been proposed. However, in the absence of properly defined processing conditions such gels have yielded agglomerates with no specific crystalline structure, porous texture or mechanical strength, with the result that little of commercial value has been obtained.

It is an object of this invention to produce and to provide a method for producing new and improved alumina agglomerates formed from alumina gel wherein the agglomerates are processed to a product having a desirable, controlled crystalline structure, a high degree of porosity which is substantially uniformly distributed throughout the cross-section thereof, and high mechanical strength whereby the activated agglomerates find widespread commercial use as an absorbent or as a catalyst carrier for use in continuous as well as batch operations.

We have discovered the conditions of treatment necessary to convert the alumina gel into an agglomerate having the desired degree of high porosity, the desired degree of activated surface area, and good mechanical strength whereby commercial use can be made of the alumina gel agglomerates produced in accordance with the practice of this invention as an absorbent or as a catalyst carrier.

In accordance with the practice of this invention, agglomerates of the type described are secured by the rapid drying of an amorphous hydrated alumina slurry under such conditions that the alumina is maintained in a finely powdered amorphous state. The amorphous powder is then wet with water or preferably with an ammonium hydroxide solution and agglomerated and the formed agglomerates are secured at a temperature within the range of 60–100° C. in a protective atmosphere after which the material is calcined at a much higher temperature, depending upon the desired activity and porosity.

It has been found that the setting of the dried amorphous hydrated alumina, agglomerated with water or ammonia solution, can be carried out simultaneously with the ultimate cure with the result that the initially amorphous alumina is converted to the crystalline state whereby the final activities can be carried out at various temperatures without detracting from the mechanical strength of the agglomerates.

The change in state of the agglomerates at low temperature from the amorphous alumina to the crystalline state can be achieved primarily when the anion content of the alumina gel is sufficiently low. The crystalline state which is obtained at low temperature represents a gelatinous variety of boehmite, referred to as pseudo-boehmite. The latter can be activated at relatively high temperature, such as a temperature not in excess of 1400° C., without loss of mechanical strength. The amorphous gel should have anions sufficient to maintain the amorphous state for a time at least sufficient for the steps of washing and drying to be carried out. In commercial practice, it is possible to select the amount of acidity for use in the treatment of the gels which provides a sufficient percentage of anions for easy maintenance of the amorphous state and thereafter to adjust to the basic side, during agglomeration, for conversion of the amorphous gel to the crystalline state.

The amorphous alumina gel which is employed as starting material in the practice of this invention can be obtained by well known means. For example, a suitable gel can be secured by precipitation at room temperature of sodium aluminate by addition of an acid such as nitric acid in an amount to provide a pH preferably within the range of 8 to 9 but which may go as high as 10. This leaves the amorphous gel with anions sufficient to maintain the amorphous state during drying but which can be neutralized with ammonia to bring about the transformation to the crystalline state.

In order to insure the maintenance of the amorphous state of the gel, the steps of precipitation, washing and drying should be conducted as rapidly as possible, preferably in less than 48 hours. The initial drying should be carried out quickly and at as low a temperature as possible, such as less than one hour and preferably in the matter of minutes. The temperature to which the alumina is exposed during the final stages of drying is not so critical. As a result it may go as high as a few hundred degrees without change in the amorphous state of the alumina. The rate of drying is also not critical and a weight loss of 35% is usual for gels which are suitable for use in the practice of this invention. A preferred process for drying comprises atomization of the slurry of the amorphous gel in a current of warm air at a temperature which does not exceed 200° C. at the inlet whereby the actual temperature of the alumina will be considerably less and its amorphous character will be maintained. Two examples will hereinafter be given by way of illustration, but not by way of limitation, of the practice of this invention. In one example, neutralization is achieved by the use of ammonia while in the other example the process is carried out without neutralization of the anions in the amorphous gel but wherein the amount of anions is initially controlled to prevent crystal formation of the amorphous alumina during the preliminary operations of agglomeration and drying.

EXAMPLE 1

Aluminum hydroxide is precipitated in the gel state by continuously mixing a solution of sodium aluminate containing 100 grams per liter of alumina, calculated as $Al_2O_3$, and a solution of 3 N nitric acid in an amount to adjust the pH of the suspension to about 8.5. The suspension is centrifuged and the separated solids washed with de-ionized water.

The quantity of residual sodium, expressed as $Na_2O$, in relation to $Al_2O_3$ is less than 200 p.p.m. and the ratio in moles of $NO_3/Al_2O_3$ is 0.18. The cake is introduced into deionized water until a viscous slurry is obtained containing 60 grams per liter of $Al_2O_3$. The slurry is dried by atomization, the temperature of the drying air being 200° C. at the point of introduction into the dryer and 110° C. at the exit portion of the dryer. The collected gel, which is entirely amorphous in structure, is in the form of spherules of 10 to 20μ in diameter and experiences an ignition loss of 35%. The powder is agglomerated in a granulating bowl with a 1 molar solution of ammonia. The balls are cured in a confined atmosphere for 24 hours at 80° C. to form pseudoboehmite. The balls are dried and calcined at elevated temperature. The calcining temperature depends upon the characteristics desired, such as specific surface, porous volume, size and distribution of the pores, and abrasion strength, as set forth in the following table.

| Thermal treatment of the agglomerates | m.²/g., area | cm.³/g., porous volume | Medium of pores and remarks on their repartition | Percent Attrition |
| --- | --- | --- | --- | --- |
| 500° C | 342 | 0.63 | 0.15 cm.³/g. of pores 0.1μ | 2.5 |
| 900° C | 146 | | | 2.5 |
| 1,100° C | 17 | 0.42 | 0.13 cm.³/g. from 0.1 to 5μ | |
| | | | 0.22 cm.³/g. from 0.1 to 0.015μ | 2.0 |
| 1,200° C | 10 | 0.40 | 0.16 cm.³/g. of 0.15μ | |
| | | | 0.24 cm.³/g. from 0.1 to 0.03μ | 2.1 |
| 1,250° C | 7.8 | 0.37 | 0.13 cm.³/g. of 0.2-2μ | |
| | | | 0.24 cm.³/g. of 0.2-0.07μ | 2.0 |
| 1,400° C | 5 | 0.35 | 0.17 cm.³/g. of 0.2-2μ | |
| | | | 0.18 cm.³/g. from 0.2 to 0.1μ | 2.5 |
| 1,600° C | 1.5 | 0.27 | From 0.3 to 10μ | 15 |

These results show that up to a calcining temperature of 1400° C., the activation step does not lower the mechanical strength of the agglomerates. Otherwise, the specific surface and the porosity appear to be a function of the temperature of activation.

EXAMPLE 2

The procedure is the same as that in Example 1 to the point of precipitation of the amorphous alumina from the gel. In this example, the precipitation is effected at a pH between 8.8 and 9. The centrifuged precipitate is washed, as in the preceding example, and a cake is obtained having 200 p.p.m. of $Na_2O$ with a molar ratio $NO_3/Al_2O_3$ of 0.08. A slurry is formed containing 30 grams per liter of alumina calculated as $Al_2O_3$ and the slurry is dried by atomization in which the air at the inlet is within the range of 130–140° C. and the air at the outlet is within the range of 80–85° C.

The gel, which is collected as spherules having a diameter of 5–10μ, is agglomerated in the granulating bowl with de-ionized water. Balls are obtained which are cured in an enclosed atmosphere for 15 hours at 80° C. Balls, treated as in the previous example, and in the form of pseudoboehmite, are activated by calcining at the same temperatures, with the same results as in Example 1.

It will be understood that other suitable means may be employed for processing the amorphous gels and that it is possible, by partial dehydration of the gels, granulation and curing at low temperature, to obtain pseudoboehmite balls for activation at various temperatures in accordance with the practice of this invention. The apparatus mentioned in the examples is given solely by way of illustration, it being understood that the washing in the centrifuge, the use of a granulating bowl and atomization for drying are only suggested as suitable means for carrying out the various operations and that other means for achieving the same operations under the same general conditions can be employed.

It will be understood that changes may be made in the details of the conditions and materials for operation without departing from the spirit of the invention, especially as defined in the following claims.

We claim:
1. The method for the manufacture of porous alumina agglomerates of high mechanical strength from alumina gel comprising forming an aqueous slurry of amorphous hydrated alumina gel, rapidly drying the amorphous hydrated alumina gel to a fine powder in which the alumina gel maintains the amorphous state, moistening the powdered amorphous alumina gel with aqueous medium, agglomerating the moistened powder, curing the agglomerate in a protective atmosphere at a temperature within the range of 60 to 100° C. to convert the amorphous alumina gel to pseudoboehmite, drying, and then calcining the agglomerate at elevated calcining temperatures.

2. The method as claimed in claim 1 in which the alumina gel is produced by acid precipitation of a sodium aluminate solution.

3. The method as claimed in claim 2 in which the acid is added for precipitation in an amount to adjust the pH of the sodium aluminate solution to between 8 and 10.

4. The method as claimed in claim 1 in which the anhydrous alumina gel is dried in less than one hour to maintain the amorphous state.

5. The method as claimed in claim 1 in which drying is carried out by atomization of the slurry into a current of warm gas which does not exceed a temperature of 200° C.

6. The method as claimed in claim 1 in which aglomeration is carried out in an agglomerating bowl.

7. The method as claimed in claim 1 in which the agglomerate is heated to a calcining temperature which does not exceed 1400° C.

8. The method as claimed in claim 1 in which the dried amorphous alumina gel is moistened with an aqueous ammonium solution to neutralize anions for conversion of the alumina from the amorphous state to a crystalline state during subsequent cure.

9. The method as claimed in claim 1 which includes the step of maintaining the anion content of the amorphous alumina gel to a level sufficient for maintaining the alumina in the amorphous state during drying.

References Cited

UNITED STATES PATENTS

| | | | |
| --- | --- | --- | --- |
| 2,913,400 | 11/1959 | Burton et al. | 23—143 X |
| 2,980,632 | 4/1961 | Malley et al. | 252—465 |
| 2,988,520 | 6/1961 | Braithwaite | 23—143 X |
| 3,264,061 | 8/1966 | Kehl et al. | 23—141 |
| 3,264,069 | 8/1966 | Getty | 23—143 X |
| 3,268,295 | 8/1966 | Armbrust et al. | 23—141 |
| 3,352,636 | 11/1967 | Wilson et al. | 23—143 |
| 3,379,499 | 4/1968 | Moehl | 23—141 |

EARL C. THOMAS, *Primary Examiner.*

G. T. OZAKI, *Assistant Examiner.*